(12) United States Patent  (10) Patent No.: US 7,492,257 B2
Tethrake et al.  (45) Date of Patent: *Feb. 17, 2009

(54) SYSTEMS AND METHODS FOR PROCESSING SURGICAL INSTRUMENT TRAY SHIPPING TOTES

(75) Inventors: Steven M. Tethrake, Collierville, TN (US); Robert Varner, Germantown, TN (US); Jeffrey H. Nycz, Collierville, TN (US); Chad Chun, Hernando, MS (US)

(73) Assignee: Warsaw Orthopedic, Inc.

( * ) Notice: Subject to any disclaimer, the term of this patent is extended or adjusted under 35 U.S.C. 154(b) by 339 days.

This patent is subject to a terminal disclaimer.

(21) Appl. No.: 11/354,080

(22) Filed: Feb. 15, 2006

(65) Prior Publication Data

US 2006/0145856 A1    Jul. 6, 2006

Related U.S. Application Data

(63) Continuation-in-part of application No. 10/993,487, filed on Nov. 22, 2004, now Pat. No. 7,227,469.

(51) Int. Cl.
*G08B 13/14* (2006.01)
(52) U.S. Cl. .................................. 340/572.1; 340/676
(58) Field of Classification Search ................ 340/676, 340/571.2; 128/604; 235/375, 385
See application file for complete search history.

(56) References Cited

U.S. PATENT DOCUMENTS

| 4,075,632 | A | 2/1978 | Baldwin et al. |
|---|---|---|---|
| 4,360,801 | A | 11/1982 | Duhame |
| 4,390,880 | A | 6/1983 | Henoch |
| 4,688,026 | A | 8/1987 | Scribner et al. |
| 4,739,328 | A | 4/1988 | Koelle et al. |
| 5,030,807 | A | 7/1991 | Landt et al. |
| 5,621,199 | A | 4/1997 | Calari et al. |
| 5,912,818 | A | 6/1999 | McGrady et al. |
| 5,923,001 | A | 7/1999 | Morris et al. |
| 5,963,134 | A | 10/1999 | Bowers et al. |
| 6,158,437 | A | 12/2000 | Vagley |
| 6,164,738 | A | 12/2000 | Dane et al. |
| 6,193,160 | B1 * | 2/2001 | Zembitski ............. 235/472.01 |
| 6,318,636 | B1 | 11/2001 | Reynolds et al. |
| 6,405,863 | B1 | 6/2002 | Dhindsa |

(Continued)

OTHER PUBLICATIONS

Presentation by Innovision Research and Technology, PLC at the "RFID in Healthcare" conference in Washington, DC. on Dec. 2 and 3, 2003.

(Continued)

*Primary Examiner*—Daniel Wu
*Assistant Examiner*—Shirley Lu
(74) *Attorney, Agent, or Firm*—Medtronic Spinal and Biologics

(57) ABSTRACT

Systems and methods for processing surgical instrument tray shipping totes. A control system is adapted to control a bar code reader module, an RFID module, a database module and an interface module. The control system provides functionality adapted to process incoming and outgoing surgical instrument shipping totes containing one or more RFID-enabled surgical instrument trays. A database, ERP system or other system in communication with the control system alerts the operator of the status of an incoming tote and/or trays contained in the tote to increase processing efficiency and speed.

22 Claims, 9 Drawing Sheets

U.S. PATENT DOCUMENTS

| | | |
|---|---|---|
| 6,415,978 B1 | 7/2002 | McAllister |
| 6,426,041 B1 | 7/2002 | Smith |
| 6,429,776 B1 | 8/2002 | Alicot et al. |
| 6,480,101 B1 | 11/2002 | Kelly et al. |
| 6,523,752 B2 | 2/2003 | Nishitani et al. |
| 6,646,241 B1 | 11/2003 | Varma et al. |
| 6,648,223 B2 | 11/2003 | Boukhny et al. |
| 6,669,089 B2 | 12/2003 | Cybulski et al. |
| 6,777,623 B2 | 8/2004 | Ballard |
| 6,825,766 B2 | 11/2004 | Hewitt et al. |
| 6,853,303 B2 | 2/2005 | Chen et al. |
| 6,861,954 B2 | 3/2005 | Levin |
| 6,866,147 B2 | 3/2005 | Barwick |
| 6,935,560 B2 | 8/2005 | Andreasson et al. |
| 7,012,529 B2 * | 3/2006 | Sajkowsky ............... 340/572.1 |
| 7,227,469 B2 * | 6/2007 | Varner et al. ............. 340/572.1 |
| 2002/0032435 A1 | 3/2002 | Levin |
| 2002/0063622 A1 | 5/2002 | Armstrong et al. |
| 2002/0105424 A1 | 8/2002 | Alicot et al. |
| 2002/0143320 A1 | 10/2002 | Levin |
| 2002/0188259 A1 | 12/2002 | Hickle et al. |
| 2003/0164401 A1 | 9/2003 | Andreasson et al. |
| 2003/0174099 A1 | 9/2003 | Bauer et al. |
| 2003/0189094 A1 | 10/2003 | Trabitz |
| 2003/0196837 A1 | 10/2003 | Ballard |
| 2004/0008123 A1 | 1/2004 | Carrender et al. |
| 2004/0022227 A1 | 2/2004 | Lynch et al. |
| 2004/0031626 A1 | 2/2004 | Morris et al. |
| 2004/0069851 A1 | 4/2004 | Grunes et al. |
| 2004/0100384 A1 | 5/2004 | Chen et al. |
| 2004/0160233 A1 | 8/2004 | Forster |
| 2004/0174244 A1 | 9/2004 | Eidemiller |
| 2004/0174261 A1 | 9/2004 | Volpi et al. |
| 2004/0220602 A1 | 11/2004 | Deng et al. |
| 2004/0220860 A1 | 11/2004 | Persky et al. |
| 2004/0250819 A1 | 12/2004 | Blair et al. |
| 2004/0267297 A1 | 12/2004 | Malackowski |
| 2005/0003757 A1 | 1/2005 | Anderson |
| 2005/0012617 A1 | 1/2005 | DiSilvestro et al. |
| 2005/0280536 A1 | 12/2005 | Hamilton et al. |
| 2006/0129140 A1 | 6/2006 | Todd et al. |

OTHER PUBLICATIONS (http://rfidjournal.com/article/view/112) RFID Journal, Can RFID Cure Healthcare's Ills?, Nov. 12, 2002.

(http://usatoday.printthis.clickability.com/pt/cpt?action=cpt&expire=&urlID=8067862&fb=. . . ) Svensson, Peter "Conductive ink advances electronics," USATODAY.com—(New York) pp. 1-3, prior to at least Feb. 15, 2006.

(http://www.eetimes.com/showPressRelease.jhtml?articleID=57907) EE Times (www.eetimes.com) "T-Ink™ Unique Conductive Ink Technology to Be Featured" Feb 14, 2003, pp. 1-2.

(http://americanprinter.com/microsites/magazinearticle.asp?mode=print&magazinearticleid . . . ) American Printer (www.americanprinter.com) "Tracking RFID Progress" Jan. 1, 2004, pp. 1-3.

(http://pffc-online.com/microsites/newsarticle.asp?mode=print&newsarticleid=2708965&re) Byrd-Thompson, Nsenga, (PFFC) Paper Film & Foil Converter (www.pffc-online.com), "RFID and Conductive Inks: What You Need To Know" pp. 1-3, prior to at least Feb. 15, 2006.

* cited by examiner

FIG. 11

Receive Totes — 610

Active/Previous Group
- Airbill: 850295848259
- Set 1 ID: 049037
- Set 2 ID: 058136
- Set 3 ID:
- Set 4 ID:
- Set 5 ID:
- Set 6 ID:
- Tag Count: 2

Airbill Queue

Barcode Data

[Skip Tote] [Clear Airbill Queue] [Tote Defect] [Exit]

FIG. 12

Initialize Tray-Tags — 615

- Tray Name:
- Tray RFID: 049036

[Exit and Return to Main]

Writing 049036 to 02E361BA012EA001

SYSTEMS AND METHODS FOR PROCESSING SURGICAL INSTRUMENT TRAY SHIPPING TOTES

CROSS REFERENCE TO RELATED APPLICATION(S)

This application is a continuation-in-part of U.S. patent application Ser. No. 10/993,487 entitled "Surgical Instrument Tray Shipping Tote Identification System and Methods of Using Same," filed Nov. 22, 2004 now U.S. Pat. No. 7,227,469, the disclosure of which is hereby incorporated by reference in its entirety.

FIELD OF THE INVENTION

The invention generally relates to an apparatus and method for implementing radio frequency identification techniques, and more particularly to systems and methods for processing surgical instrument tray shipping totes and control and/or operating systems for systems for processing surgical instrument tray shipping totes.

BACKGROUND OF THE INVENTION

Surgical instrument storage and sterilization systems are known. These systems, sometimes referred to as surgical instrument trays or surgical instrument kits, typically consist of metal or plastic trays that hold a variety of general purpose and/or procedure specific surgical instruments such as forceps, scissors, clamps, retractors, scalpels, etc. These trays are brought into the operating room (OR) when preparing for surgery, and also are used as a means to organize, transport and store surgical instruments in a medical facility.

A primary function provided by surgical trays, in addition to storage, is to facilitate group sterilization. Sterilization is of paramount importance in a surgical setting such as a hospital to prevent potentially deadly infections to patients undergoing surgery. Prior to every surgical procedure, all surgical instruments and trays must be sterilized. Also, following each surgical procedure, all instruments on a given tray, if not wrapped separately, whether soiled or not, must be re-sterilized before subsequent usage. In order to increase the speed and efficiency of sterilization, entire surgical trays containing several instruments often are placed in a sterilization chamber at once. The sterilization chamber may provide any combination of heat, pressure, and/or fluid or vaporous sterilant to the trays and all the instruments contained therein. Sterilization techniques are well known. Thus, a detailed discussion of them has been intentionally omitted.

Because of the need to perform sterilization and the general need to maintain surgical instruments kits in good working order, they are often transported in and out of medical facilities through a distribution center for processing. For example, several surgical instrument kits may be picked up from a hospital or other medical facility at one time. In order to easily and efficiently transport the kits, several kits are placed in a single shipping tote. The shipping tote is a large bin, usually made of plastic or other durable, lightweight material that is able to securely hold two or more instrument kits inside. A worker then may load the shipping totes into a vehicle thereby reducing the number of manual operations that must be performed. Before transporting each shipping tote, a bar coded shipping label is sometimes prepared that identifies certain information such as the point of origin, the destination, and possibly the contents of the tote, i.e., the identification number of each surgical instrument tray contained in the tote. The bar coded label allows the tote to be easily and efficiently tracked and entered into inventory at the receiving facility. These labels are sometimes referred to as "airbills."

Over time, and through ordinary usage, as well as due to rigors of the sterilization process, surgical instruments suffer wear and tear and eventually reach the end of their life cycle. Thus, it is necessary to periodically inspect and maintain records on usage of surgical instruments so that they can be replaced as necessary. Also, due to the fact that they are constantly moved from the operating room to sterilization, to storage through processing facilities, and back to the operating room, various instruments on a given tray may become lost. Because certain instruments are so specialized that there are no functional substitutes, it also has become necessary to regularly inspect trays for any missing instruments and to readily identify specific instruments that are missing. Existing methods for performing these necessary functions are overly reliant on costly human interpretation. Also, in some cases, a skilled technician may be required to identify missing instruments.

While bar code labels are effective for short durations under ordinary conditions, they are not effective as a means of identifying surgical instrument trays. Bar code labels could not withstand the environments that surgical instrument trays are subjected to. As a result, radio frequency identification (RFID) tags have been proposed for tracking surgical instrument trays.

Radio frequency identification (RFID) systems use an RF field generator (reader) to wirelessly extract identification information (i.e., UPC, product name, etc.) contained in RFID transponder tags attached to various products and objects. RFID tags are miniature electronic circuits that typically consist of a coil that acts as an antenna and a small silicon-based microprocessor with a memory, all encapsulated in a protective material. RFID tags store identification information, usually in the form of an identification number that corresponds to an object or item to which the tag is attached. This number may be used to index a database containing price, product name, manufacture and/or other information. When a transponder tag enters an RF field generated by a reader device, the circuit of the tag becomes energized causing the processor to perform a data operation, usually by emitting a signal containing the processor's stored information. The basic structure and operation of RFID tags can be found in, for example, U.S. Pat. Nos. 4,075,632, 4,360,801, 4,390,880, 4,739,328 and 5,030,807, the disclosures of which are hereby incorporated by reference in their entirety.

Thus, there is a need for a control system that integrates bar code technology and RFID technology for processing surgical instrument shipping totes containing one or more instrument trays in a single process without emptying the tote to process each tray individually.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Therefore, in view of the foregoing, there exists a need to provide control system for an surgical instrument tray shipping tote identification system that increases throughput, reduces human errors, increases accuracy, reduces handling costs and provides accurate and rapid tracking of surgical instrument tray shipping totes.

Embodiments of the present invention mitigate or solve the above-identified limitations in known solutions, as well as other unspecified deficiencies in known solutions. A number of advantages associated with various embodiments of the present invention are readily evident to those skilled in the art, including economy of design and resources, transparent operation, cost savings, etc. Various exemplary embodiments according to the methods and apparatus of the present invention allow for lower handling costs of surgical instruments, increased accuracy of the verification process of data pertaining to each instrument tray and shipping tote with a reduction of human contact, and provide real-time data collection resulting in fast data acquisition, which ultimately speeds up inventory updating of such instrument trays and totes.

In accordance with one embodiment of the present invention, a surgical instrument tray shipping tote tracking system is provided. The surgical instrument tray shipping tote tracking system according to this embodiment comprises a dual purpose bar code scanner and RFID reader/writer device, and a series of computer readable instructions stored in the dual purpose device adapted to cause the device to activate a bar code scanner to obtain bar code data from a bar coded label affixed to a surgical instrument shipping tote activate an RFID reader to obtain identification information from one or more surgical instrument trays in the shipping tote, query a database containing status information using at least one of the bar code data and identification information, and activate an indicator based on the results of querying the database.

Another exemplary embodiment of the invention provides a computer readable storage medium containing computer readable instructions stored therein for operating a surgical instrument tray shipping tote inventory management system. The computer readable instructions according to this embodiment comprise instructions for activating a bar code reader and for receiving a first input from the bar code reader, the first input originating from a shipping tote air bill label associated with the shipping tote, instructions for activating an RFID reader and for receiving at least one second input from the RFID reader, the at least one second input originating from an RFID transponder tag corresponding to a surgical instrument tray in the shipping tote, instructions for querying a status database using at least one of the first input and second input, and instructions for activating a status indicator.

In another exemplary embodiment, a control system for a surgical instrument tray shipping tote processing system is provided. The control system according to this embodiment comprises a bar code scanner module adapted to activate a bar code scanner and receive a bar coded input indicative a surgical instrument shipping tote air bill label, an RFID reader module adapted to activate an RFID reader and receive identification information from one or more RFID enabled surgical instrument trays in the shipping tote, a status module adapted to query a status database using at least one of the bar coded input and the identification information to determine a status associated with the tote, and an indicator module adapted to activate one of a plurality of indicators based on the determined status.

Other aspects and advantages of the invention will become apparent from the following detailed description, taken in conjunction with the accompanying drawings, illustrating by way of example the principles of the invention.

BRIEF DESCRIPTION OF THE DRAWINGS

Purposes and advantages of the present invention will be apparent to those of ordinary skill in the art from the following detailed description in conjunction with the appended drawings in which like reference characters are used to indicate like elements, and in which:

FIGS. 10 and 11 are an exemplary screen shot of a receive tote user interface screen for a surgical instrument tray shipping tote processing system according to at least one embodiment of the invention;

FIG. 12 is an exemplary screen shot of an initialize tray interface screen of a surgical instrument tray shipping tote processing system according to at least one embodiment of the invention.

DETAILED DESCRIPTION OF THE DISCLOSURE

The following description is intended to convey a thorough understanding of the invention by providing specific embodiments and details involving systems and methods of processing surgical instrument tray shipping totes and control and/or operating systems for systems for processing surgical instrument tray shipping totes. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

As used herein, the expressions "RFID tag" and "RFID transponder tag" will refer to any active or passive type of electronic data storage device, read-only or read and write, that is wirelessly activated in the presence of a radio frequency (RF) field, including any currently available inductively coupled RFID tags, capacitively coupled RFID tags and even future RF-type tags not yet available. This includes tags operating in the 125 kHz, 13.56 MHz, 868-927 MHz, 2.45 GHz and 5.8 GHz frequency bands as well as other suitable frequency bands. Also, the tag may be a silicon-type IC tag, a printed tag printed with a conductive ink-based printing process or a tag formed by other suitable means.

As used herein, the terms "write" and "program" in the context of storing data to a memory structure contained in an RFID transponder tag circuit will be used synonymously to refer to the process of transmitting a radio frequency signal that has been modulated to contain identification information to be stored in the memory structure. The tag circuit includes an antenna, processor and memory structure. The tag circuit is able to receive the signal, recover the encoded information and store that information in the non-volatile memory structure so that it can be wirelessly accessed by RFID reader devices.

Through out this description, the expression "surgical instrument tray shipping tote processing system" will be given broad meaning including, but not limited to, any type of computerized, handheld, portable, or stationary device consisting of a single unitary structure or separate structures in communication with one another, that is capable of receiving a bar code input, receiving an RF input from one or more RFID transponder tags, querying a database with the bar code input and RF input to determine a status associated with the tray and an indicate a status to the operator.

As used herein, the term "initialize" in the context of initializing an instrument tray will refer to the process of adding the unique identification number of the tray to the system and associating a name with the tray. The name may be written to the tag itself or stored in a database of the system in association with the tag's unique identification number.

Figure 1:
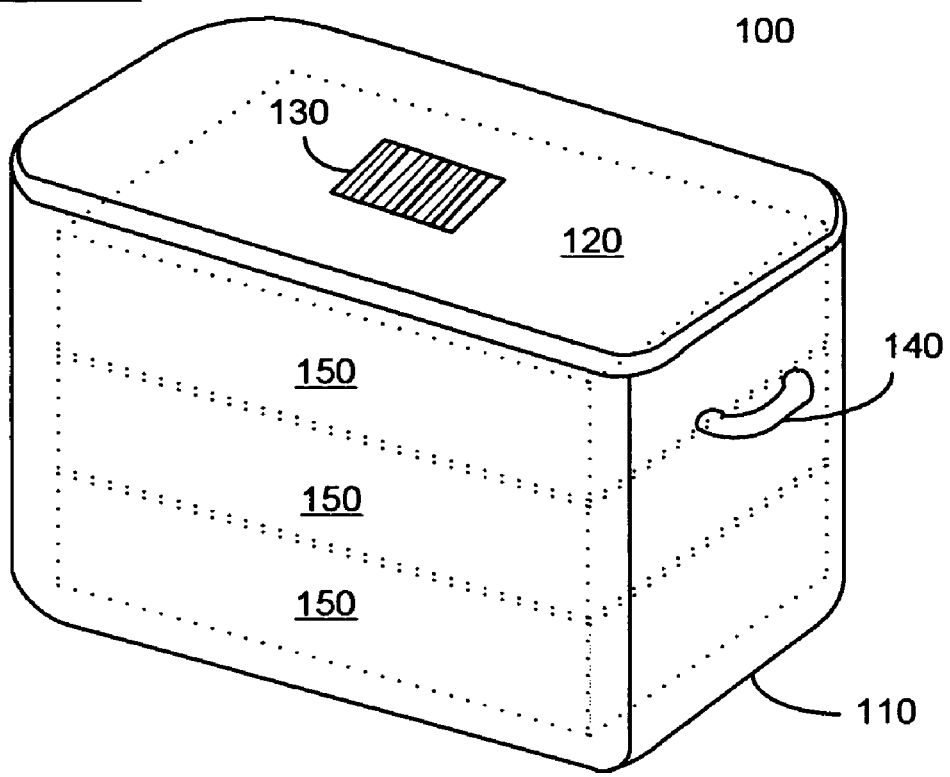
FIG. 1 is a schematic diagram of surgical instrument tray shipping tote in accordance with various embodiments of the invention.
Figure 2:
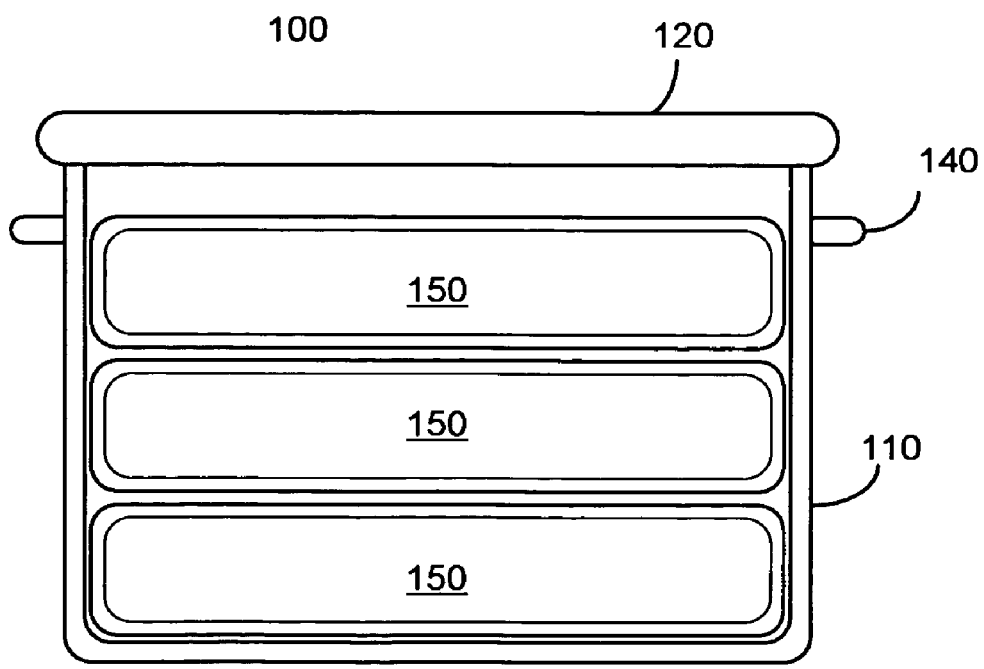
FIG. 2 is a cutaway profile view of the surgical instrument tray shipping tote of FIG. 1 in accordance with various embodiments of the invention.

Referring now to FIGS. 1 and 2, these figures illustrate perspective and side cut-away views respectively of a surgical instrument kit shipping tote 100 for transporting multiple of surgical instrument kits, such as, for example, in and out of a distribution and processing center in accordance with various embodiments. The shipping tote 100 preferably comprises a main body portion 110, a lid portion 120 including a bar coded shipping label 130, and one or more carrying handles 140. The shipping tote 100 is shown in FIGS. 1 and 2 as being translucent for purposes of example only. Shipping totes usable with the various embodiments of the invention may or may not be constructed of light permeable materials. The various embodiments are compatible with a variety of different types and brands of shipping totes. Also, though the shipping tote 100 illustrated in FIGS. 1 and 2 is shown as being large enough to accommodate three instrument trays, it should be appreciated that shipping totes usable with the various embodiments of the invention may contain more or less than three surgical instrument trays therein.

In various embodiments, the shipping tote 100 may be manufactured to work with a specific brand or size of instrument tray to reduce motion within the tote 100. In practical application, an operator will load an empty tote at the medical facility when the operator picks up surgical instrument kits to take to the distribution center. At that time, the operator will generate a bar coded air bill label with a computer or hand held terminal and affix the label to a surface of the tote. As will be discussed in greater detail herein, when the tote arrives at the distribution center, it can be quickly checked-in using the bar coded shipping label.

Figure 3:
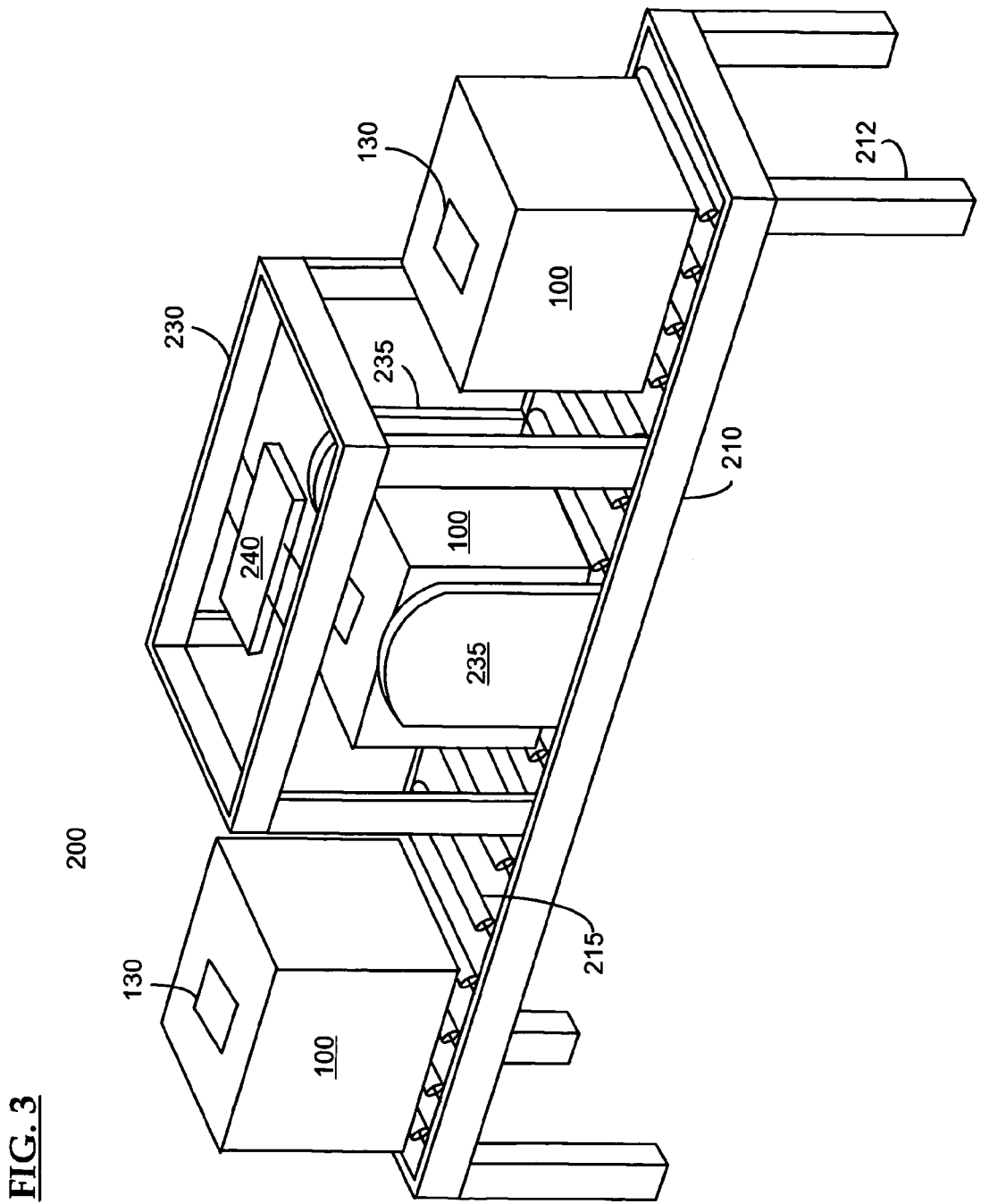
FIG. 3 is a schematic view of a workstation-type surgical instrument tray shipping tote processing system according to at least one embodiment of the invention.
Figure 4:
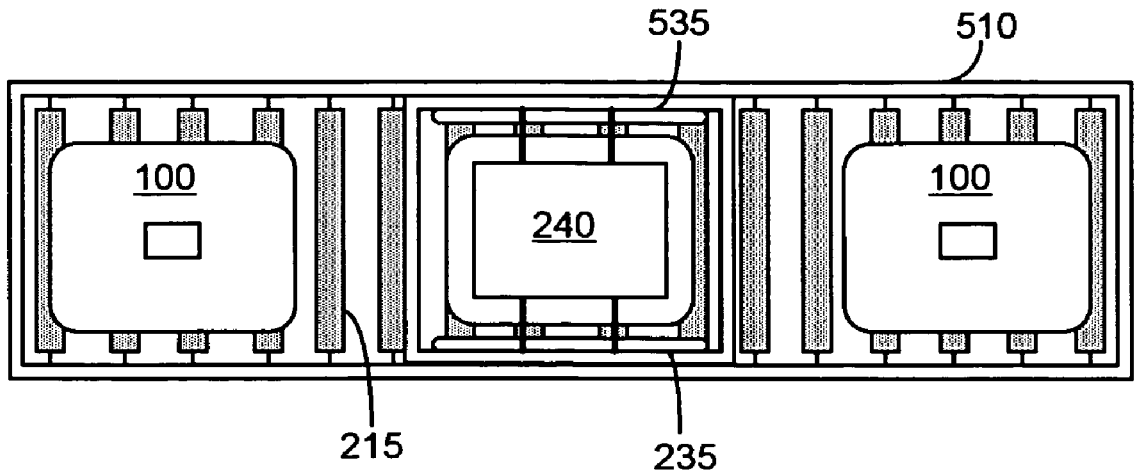
FIG. 4 is a overhead view of the workstation-type surgical instrument tray shipping tote processing system of FIG. 3 according to at least one embodiment of this invention.
Figure 5:
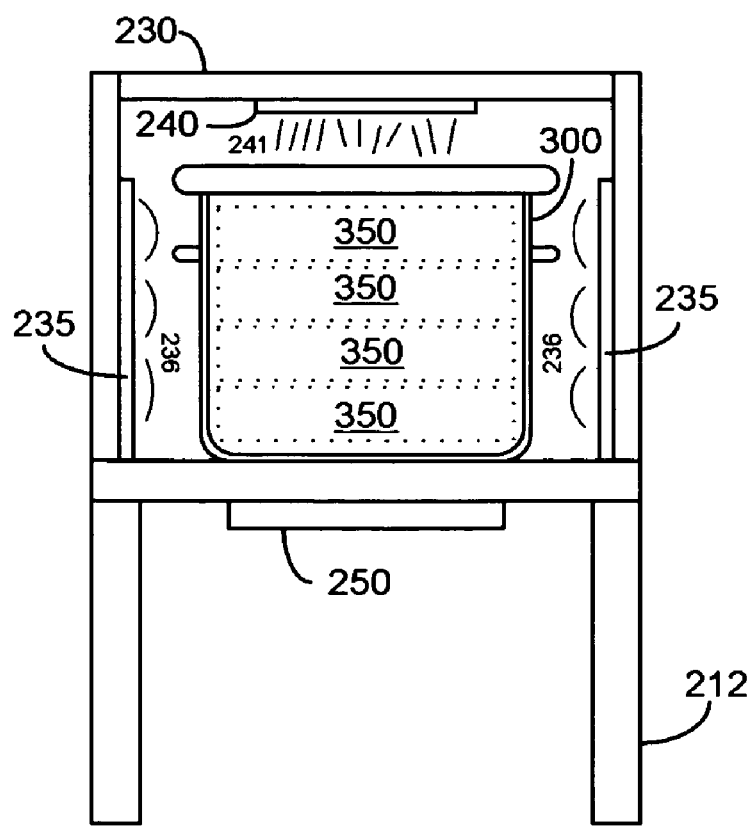
FIG. 5 is an end view of the workstation-type surgical instrument tray shipping tote processing system of FIGS. 3 and 4 according to at least one embodiment of this invention.

Referring now to FIGS. 3-5, various different views of an exemplary workstation-type surgical instrument tray shipping tote processing system for use with the various embodiments of the invention are depicted. As illustrated in these figures, the processing system 200 comprises an elevated chassis 210 supported by four or more legs 212. A conveyor system, comprising a series of rollers 215 mounted to the frame 210 defines a conveyor path along the length of the chassis 210. It should be appreciated that the system 200 described in the context of FIGS. 3-5 is exemplary only. The various embodiments of the invention are compatible with systems comprising separate units in communication with one another, hand held units, or a combination of desktop and handheld components.

A reading station 230 may be mounted to the chassis 210 and may consist of a downward looking bar code reader 240 and one or more RF transceiver antennae 235. A conveyor apparatus 215 may convey a shipping tote 200 to the reading station 230, where both the RF transceivers 235 and the bar code reader 240 are activated to read information from the shipping tote label 130 and the transponder tag attached to each surgical instrument tray within the tote, respectively. By mounting the bar coded shipping label on the top of each shipping tote and dimensioning the chassis so as to slightly exceed the width of a tote, read operations can be consistently performed by the bar code reader without requiring an operator to manually position the label 330 under the reader 540, thereby speeding up processing time. Moreover, as noted above, because RF waves can penetrate surfaces impervious to light, the oppositely mounted RF antennae 535 will create sufficient RF field strength to activate any RFID tags associated with instrument trays residing within the shipping tote 300 when it enters the reading station 530. In the embodiments illustrated in FIGS. 5-7, when the shipping tote 300 enters the reading station 530, RF waves 536 emitted by the RF transceiver antennae 535 penetrate the tote 300 from opposing sides with respect to the direction of the conveyor system. Nearly simultaneous to this, light waves 541 from the bar code reader 540 are emitted approximately downwards onto the bar coded shipping label 330 attached to the top surface of the tote 300 to create a reflection pattern discernable by the bar code scanner. A control system (not shown) encased in a lower housing 550 contains the control logic for activating the bar code scanner 540 and the RFID transceiver 535 and for receiving inputs from these devices.

In alternative configurations to those illustrated in FIGS. 3-5, the bar code scanner 240 could be positioned either on the sides or underneath the reading station 230. Similarly, the RF antennae 235 could also be positioned orthogonal to one another rather than parallel, or more or less than two antennae may be used. The various embodiments of the invention are usable with a variety of different system configurations so long as the system configuration includes at least a bar code scanner and an RFID reader device.

During practical use, an operator will place a shipping tote 100 onto the conveyor system 215. The system 200 is activated either manually, by the operator, or through an automatic activation means such as a pressure sensor, a light sensor or other sensing means. Once activated both the bar code reader 240 and RFID reader 235 will remain activated until both have been able to successfully read information from the shipping tote 100. As the tote 100 enters the reading station 230, any RFID tags attached to surgical instrument trays stored in the shipping tote will become activated and emit a signal containing their stored information. Also, the bar code reader will read a reflection pattern representative of the information encoded in the bar coded shipping label 230. The controller in the lower unit 250 will receive this data and transmit it to a computer database either connected to the controller or stored in an external computer. The controller may send the data to the computer through a wired physical connection or through a wireless transmitter utilizing a suitable wireless protocol such as infra red, RF, BLUE TOOTH, 802.11x, etc. Methods for reading a plurality of RFID tags simultaneously are known in the art. In one such method, all incoming information signals are input into a memory device. Actual signals are identified by a leading bit pattern. When a signal is written into memory, the memory is first checked to determine if the particular value already exists. Once only duplicate signals are received after expiration of a certain time period, it is assumed that all signals have been read.

The computer will enter the received data into a database and compare it against previous stored data to determine whether one or more conditions are satisfied. For example, the computer database may indicate, based on the shipping label information and the instrument tray identification information, that particular tote of instrument is scheduled for priority processing because it needs to be returned to the medical facility with expedited dispatch. Alternatively, the database may indicate that the particular tote is not scheduled for priority processing, but based on the length of service, one or more of the instrument trays in the tote are scheduled for routine inspection and/or maintenance. Still further, the database may indicate that there are no off-nominal conditions relating to the particular shipping tote and/or the instrument trays located inside. Any of these specific conditions or any other condition will require that the operator be notified so that the particular shipping tote may be handled appropriately. In order to facilitate this, the database program will cause the computer to send a signal back to the reading station controller 250 including such an indication. Also, the RFID transceivers 235 may write new data to the RFID transponder tags of each surgical instrument kit if they are configured as read and write tags, such as, for example, a date of processing.

Though not illustrated in FIGS. 3-5, the reading station 230 will preferably include an indicating means that is operable to provide an indication to the operator based on the indication provided by the database. As discussed above, this indication may be that processing should proceed as normal, that there is a problem with the current shipping tote, that the contents of the current shipping tote should be handled on an expedited basis, etc. In various exemplary embodiments, the indicator will comprise a visual indicator such as a panel of lights including, for example, a red light and a green light, whereby illumination of the red light indicates an off-nominal situation with respect to the current shipping tote, and illumination of the green light indicates that processing should continue as normal.

Alternatively to or in conjunction with a light panel, the visual indicator also may comprise a printer operable to print a label indicating a state of the current tote. The printer may be attached to a computer, attached to the reading station or simply in electrical communication with either the computer or the reading station. In various exemplary embodiments, the printer will be operable to print an indication that either processing for the current tote should be expedited, that processing should be set aside for inspection and/or maintenance, or that processing should proceed normally. This may be facilitated through printing or generating of different color stickers, through printing of a text message directly on a sticker, or through printing of a report detailing the specific state of the current shipping tote. The label or sticker will then be affixed to a surface of the shipping tote to alerts workers how to process the particular tote. In other exemplary embodiments, the indicating means will comprise an audio indicator. The audio indicator may comprise a speaker that emits one sound when processing should proceed normally and another sound when processing is off-nominal. The sounds may comprises single tones, alarms, or even voice recordings. Furthermore, the indicating means may consist of an audio indicator combined with a visual indicator. In various exemplary embodiments, activation of the indication means may cause the conveyor process to stop until the user inputs a command or acknowledges the indication.

As discussed above, the workstation apparatus of the present invention may be located in a distribution and/or processing center, sterilization-repackaging center or at a medical facility such as a hospital, so that incoming and/or outgoing shipping totes are run through the workstation apparatus and reading station so that they can be checked in and checked out of inventory and processed correctly. Alternatively, the workstation apparatus maybe may be located in a lab, university or clinical environment.

Figure 6:
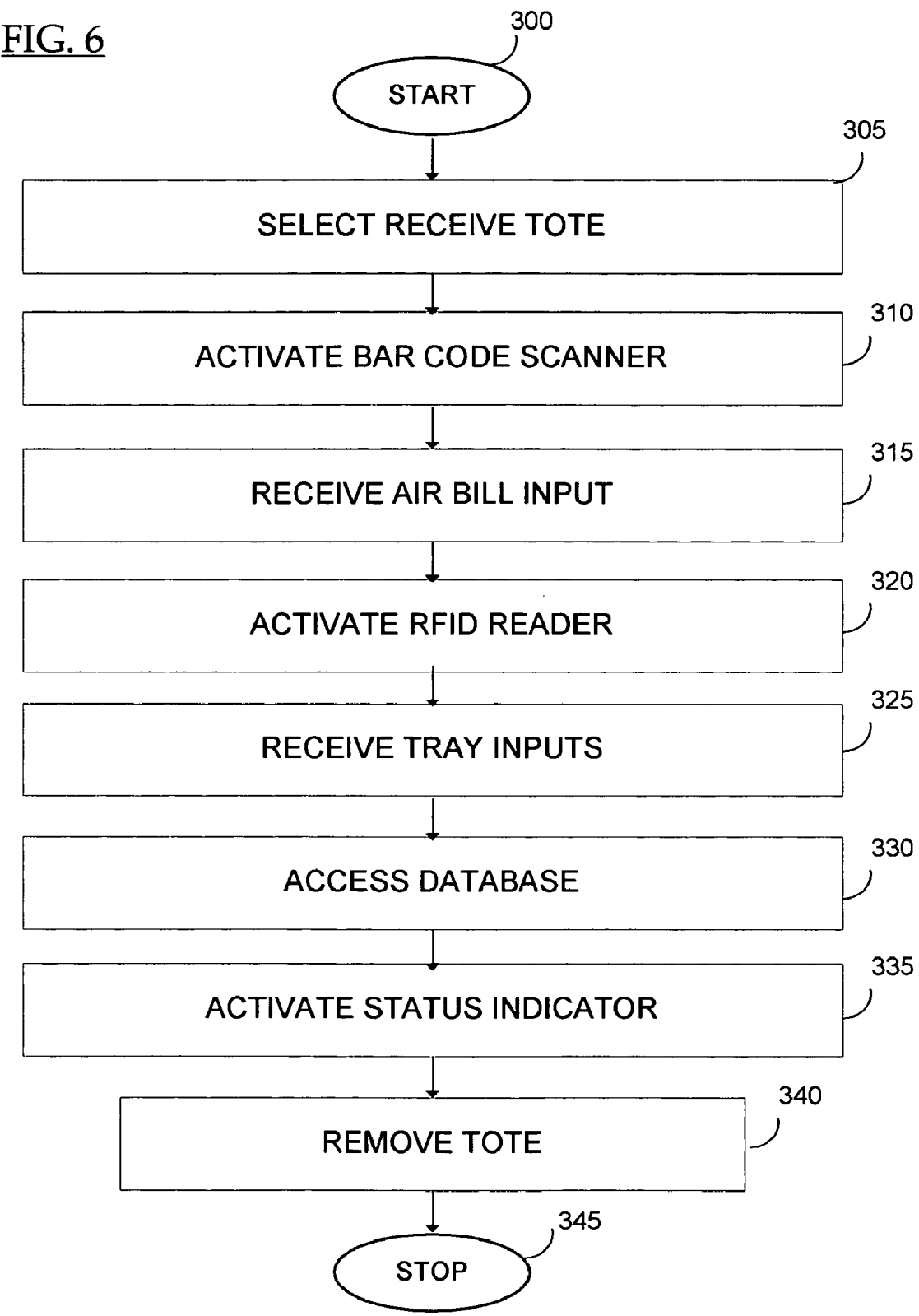
FIG. 6 is a flow chart detailing the steps of a routine for processing a surgical instrument tray shipping tote according to at least one embodiment of the invention.

Referring now to FIG. 6, a flow chart detailing the steps of a routine for processing a surgical instrument tray shipping tote according to at least one embodiment of the invention is depicted. The routine begins in step 300 and proceeds to step 305 where an operator selects a receive tote option from a user interface. Then, in step 310, in response to this selection, a bar code scanner is activated. In various embodiments, the operator will manually manipulate the bar code scanner to scan a bar coded air bill label affixed to or associated with the shipping tote. In various embodiments, the bar code scanner may automatically scan the bar code label when the shipping tote is conveyed past the scanner. Next, in step 315, an air bill number is received as a first input from the bar code scanner. Then, in step 320, an RFID reader device is activated to read information from RFID transponder tags attached to surgical instrument trays contained inside the shipping tote. In step 325, the information contained in the RFID tags is received as a second input. It should be appreciated that in various embodiments, the steps of activating the bar code scanner and RFID reader may be performed at substantially the same time that is, in parallel rather than in series.

After receiving the first and second inputs, operation of the method proceeds to step 330 where the system queries a database using the first and second data inputs. As discussed above, this may comprise querying a local database that is part of the control system or a remote database accessible through a communication module. In various embodiments the database may be an enterprise (ERP) system accessed using a application program interface (API) that allows the control system to interact with the native database language. ERP systems are management information systems that integrate and automate business practices associated with the operations and/or production aspects of a company. ERP systems typically handle aspects such as manufacturing, logistics, distribution, inventory, shipping, invoicing and accounting for a company. ERP software can aid in the control of business activities such as sales, delivery, billing, production, inventory management and human resources management. ERPs are cross-functional and enterprise wide. That is, all functional departments that are involved in operations or production are integrated in one system. In the context of the present invention, this would allow the operator to properly route surgical instrument trays based on information from the ERP system. This information could include an indication that one or more trays in the shipping tote needs priority or off nominal processing, needs to be taken out of service for maintenance or upgrading, or simply to track the usage of the tray and/or tote.

Returning to the flow chart of FIG. 6, after accessing the ERP system, operation proceeds to step 335 where a status indicator is activated. This may include providing a message on an interface module, illuminating one or more lights or LEDs, outputting a sound or other audio message, printing a report or label, or combinations of any of these. Finally, in step 340, the operator is cued to remove the tote from the system. Operation of the method stops in step 345.

Figure 7:
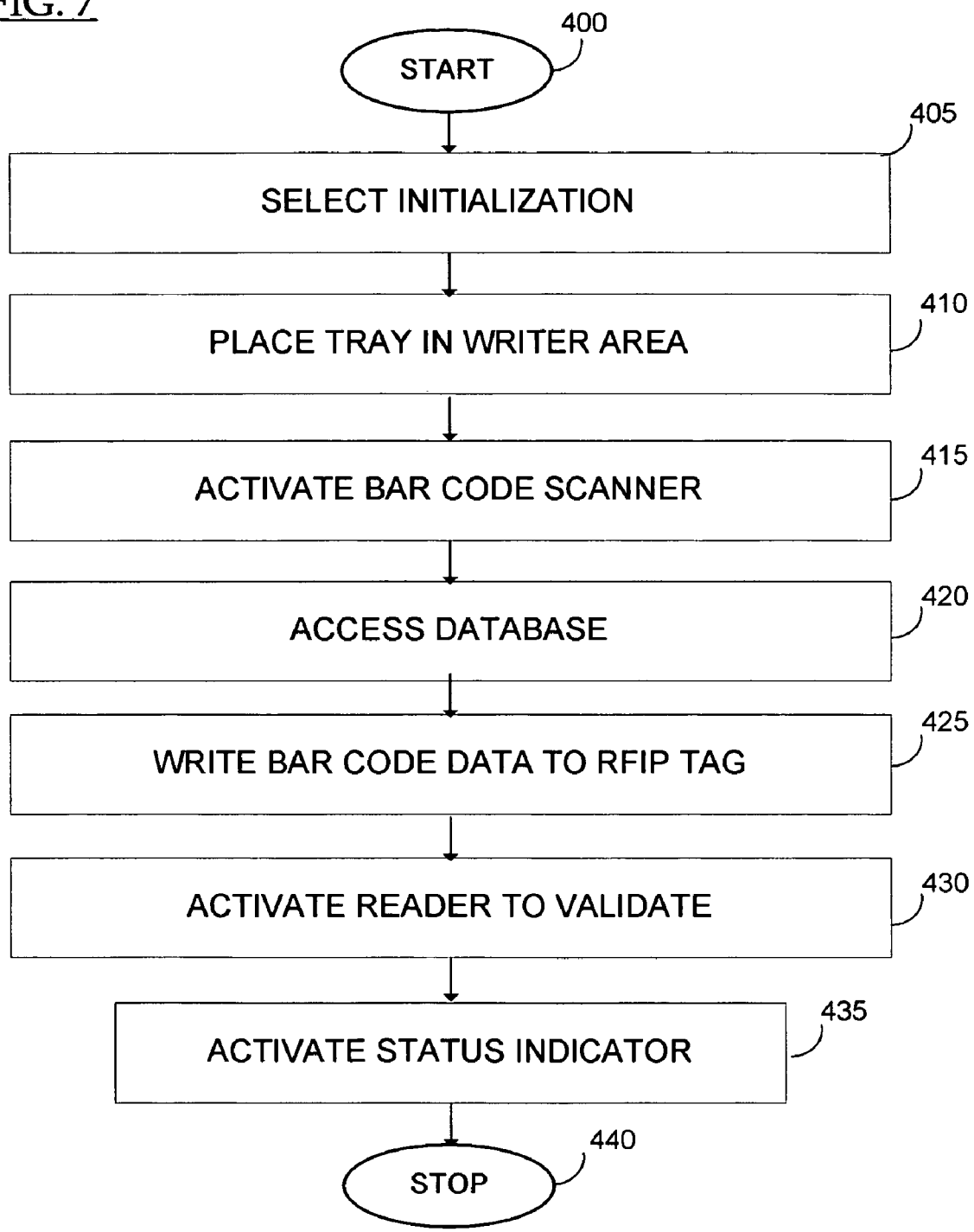
FIG. 7 is a flow chart detailing the steps of a routine for initializing a surgical instrument tray with the shipping tote processing system according to at least one embodiment of the invention.

Referring now to FIG. 7, a flow chart detailing the steps of a routine for initializing a surgical instrument tray tote according to at least one embodiment of the invention is depicted. The method begins in step 400 and proceeds to step 405 where an operator selects an initialize tray option from a high level interface menu provided by the control system. Then, in step 410, the operator is cued by the system through an interface module to place the surgical instrument tray in an work area of the system. Next, in step 415, data to be programmed to the tag is received by the system as a data input. In various embodiments, this may be performed through manual data entry on a keypad connected to the interface module. However, in various embodiments, this may be performed by activating a bar code scanner so that the operator can input the data as scanned bar code data from a bar code label on the tray or on a sticker, label, form or other document associated with the tray. Alternative data may be input to the tag through a combination of manual data entry and bar code scanning.

Once the data has been received by the system, next, in step 420, the data to be written to the tag is written to a database, such as, for example, an ERP system, so that an electronic record of the tray is recorded and that it will be recognized when subsequently processed. Next, in step 425, an RFID writer is activated to write the inputted data to an RFID tag affixed or otherwise attached to the surgical instrument tray. After the RFID reader has been activated to write the data, the system, in step 430, will activate the RFID writer to read the data just written to the tag to validate the process. Next, in step 435 the system provides a status to the operator indicating whether or not the data write operation was successful. This may comprise activating a visual indicator, outputting a message or other graphic on an interface screen, outputting an audible message or combinations of these. Operation of the method terminates in step 440.

Figure 8:
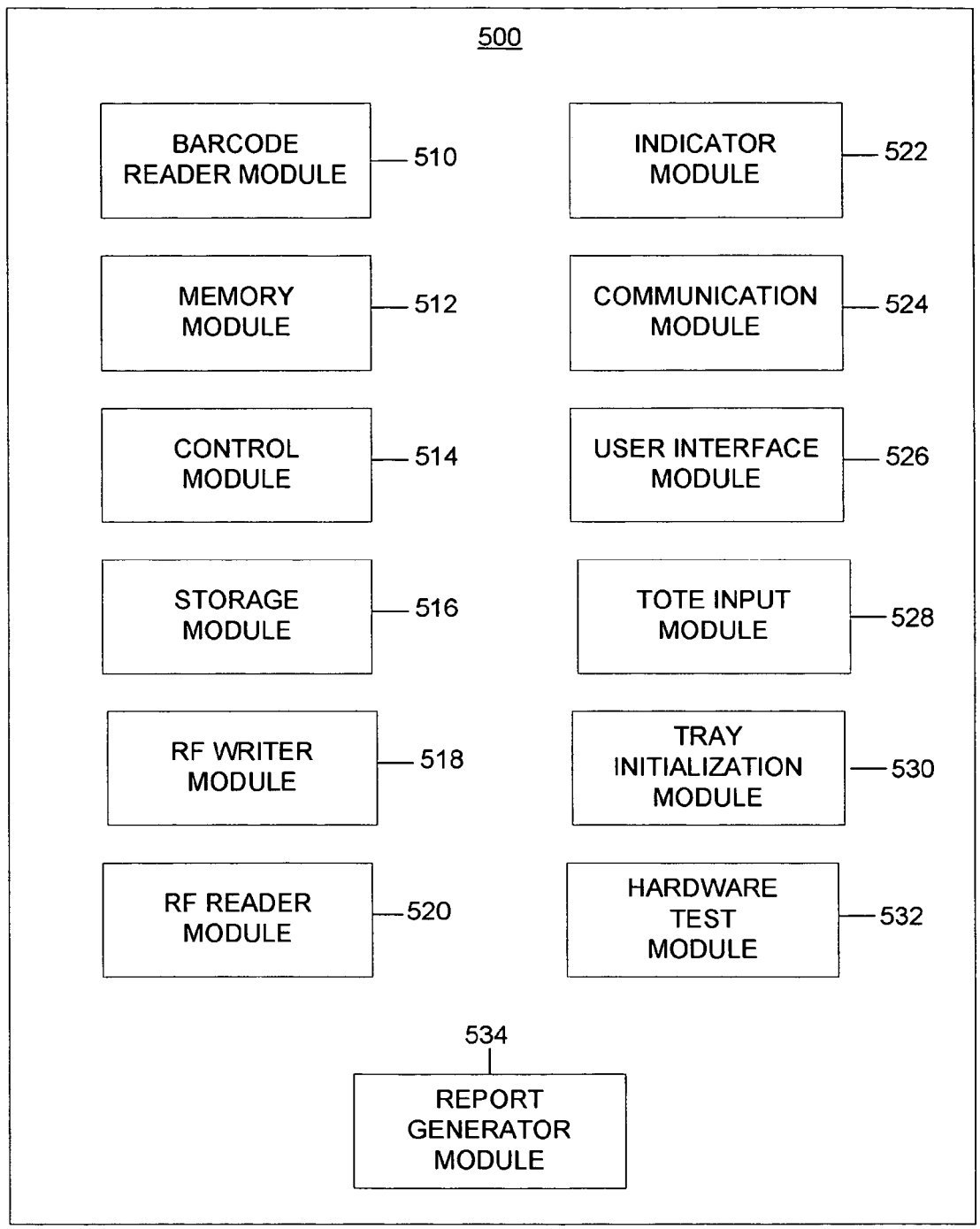
FIG. 8 is a block diagram illustrating modules of a control system for a surgical instrument tray shipping tote processing system according to at least one embodiment of the invention.

Referring now to FIG. 8, a block diagram illustrating modules of a control system for a surgical instrument tray shipping tote processing system according to at least one embodiment of the invention is illustrated. The system 500 comprises a plurality of modules including a bar code reader module 510, a memory module 512, a control module 514, a storage module 516, an RF writer module 518, an RF reader module 520, an indicator module 522, a communication module 524, a user interface module 526, a tote input module 528, and tray initialization module 530, a hardware test module 532 and a report generation module 534. Each module may comprise a separate circuit, routine or application, may be based in hardware, in software, or both, may be firmware, may be discrete components of a modular system or merely subroutines/subcomponents of the same system, such as a single computer program stored in a memory structure of a device, such as surgical instrument tray shipping tote processing system.

In various embodiments, a user will interact with the system 500 through the user interface module 526. This module may include components such as a keyboard, mouse, stylus, biometric sensor, display screen or other interface that allows an operator to interact with the system such as to input information, issue commands, power the device on an off, perform file management, upgrade software and database information, monitor output, receive feedback and perform other administrative and non-administrative tasks.

In various embodiments, a user will initiate interaction with the system by activating a switch or entering a command through the user interface module 526. In various embodiments, the user interface module 526 will present a high level menu to the operator linked to various modules such as, the tote input module 528, the tray initialization module 530, hardware test module 532 and report generation module 534.

In various embodiments, when an operator invokes the tote input module 528 by selecting a tote input command from a menu provided by the interface module 526, the control module 514 will cause the tray initialization process to begin. The control module 514 may in various embodiments be a microprocessor, a digital signal processor (DSP), control system, virtual instrument, program kernel or other suitable command issuing structure. In various embodiments, the control module may activate a conveyor motor if the system includes a powered conveyor system. Alternatively, if the system is a manual conveyor system or if the system is a work bench, stationary, hand held or other type system, the control module 514 will activate the bar code reader module 510. The bar code reader module includes a bar code reader that is used to scan a bar coded air bill label affixed to or otherwise associated with the shipping tote. In various embodiments, the information received by the bar code reader module 510 will be stored in the memory module 512. The memory module 512 may comprise volatile memory such as random access memory, non-volatile memory such as flash memory, storage such as computer hard drive, holographic storage device or other storage device, or mixtures of any of the above. In various embodiments, the control module 514 will also activate the RFID reader module 520 to generate an RF field to read information from RFID transponder tags attached to surgical instrument trays in the shipping tote. The RFID reader module 520 will receive as an input one or more fields of information from each RFID transponder tag. This information will also be stored in the memory module 512. The information received from the bar code reader module 510 and the RFID reader module 520 will comprise a data record for the current shipping tote. In various embodiments, the control module 514 will then access the storage module 526 which, may contain a database of status information and/or detailed product information that is indexed by the information obtained by either or both of the barcode reader module 510 and the RFID reader module 520. As discussed herein the database may in various embodiments comprise an ERP system or other suitable inventory tracking system. It should be appreciated that in various embodiments, the memory module 512 and storage module 516 may be consolidated into a single module. However, in other embodiments, the storage module 516 will be non-volatile storage and the memory module 512 will be temporary, volatile storage. In still further embodiments, the storage module 516 may be external to the control system 500. In such embodiments, the control module 514 may utilize the communications module 524 to access an external database in the storage module 516 that contains detailed product information. This may include using an API configured to interact with the particular database system being accessed. In such embodiments, the communication module 524 may query the remote database using the code stored in the memory module 512 that was acquired by the barcode reader module 510 and the RFID reader module 520 and will return status information regarding the current shipping tote and/or one or more surgical instrument trays in the tote. This may include information indicating that one or more the current trays require special processing, that one or more current trays should be taken out of service, that one or more trays are missing from the tote, or that unexpected trays are present. In various embodiments, this status information will be also be at least temporarily stored in the memory module 512 as part of the data record for the current shipping tote.

After the system 500 has determined the status of the current shipping tote, the control module 514 may cause the indicator module 522 to provide an indication of the status of the current tote. In various embodiments, this may comprise sending a message through the user interface module 526, activating another visual and/or audio indicator, printing a report, label or other document through the report generation module 534 of combinations of these.

In various embodiments, when an operator invokes the tray initialization module 530 by selecting a tray initialization option from a menu provided on the user interface module 526, the control module 514 will initiate the initialization process. In various embodiments, the control module 514 may cause the interface module 526 to present the operator with a choice of manual initialization or bar coded initialization. In manual initialization, the user will input information to be programmed to the tray's RFID transponder tag through a keyboard attached to the user interface module 526. The inputted information will be temporarily stored in the memory module 512. Alternatively, if the user selects bar coded initialization, the control module 514 will activate the bar code reader module 510 so that the operator can scan a bar code on or associated with the surgical instrument tray to obtain information to be written to the RFID tag. In various embodiments, this information will be stored in the memory module 512 prior to writing. In various other embodiments, the control module 514 will use the information obtained by the bar code reader module 510 to query a database in the storage module 516 to obtain more detailed information, and this information will be temporarily stored in the memory module 512. Once the information has either been input by the user or obtained by the bar code reader module 510 and/or control module 514 via the storage module 516, the control module 514 will activate the RF writer module 518 to transmit a signal containing the information from the memory module 512. This signal will activate the RFID tag of the surgical instrument tray in the RF field and cause it to store the information in the tag's memory. After this signal has been broadcast for a predetermined time period, the control module 514 may activate the RF reader module 520 to perform a read operation on the tag. In various embodiments, this will comprise generating an RF field to cause the tag to transmit its stored information and receiving a signal from the tag. The control module may cause information in this signal to be temporarily stored in the memory module 512 and compared against the information that was transmitted by the RF writer module 518. The control module may then activate the indicator module 522 to provide an indication as to whether or not the information was successfully written to the tag based on the results of the comparison between the transmitted and received information. In various embodiments, the indicator-module 522 may output a message to the user interface module 526 indicating whether or not the initialization operation was successful. The indicator module 522 may also activate one or more visual and/or audio indicators to provide an indication of whether the initialization operation was successful. In various embodiments, the control module 514 may store the information written to the RFID tag in association with an identification number for that tag so that the system will "recognize" the tag on subsequent reads and maintain a transactional data log for the tray associated with the tag based on each time it is read by the system.

In various embodiments, when an operator invokes the test hardware module 532 by selecting a test hardware option from a menu provided on the user interface module 526, the control module 514 will invoke a menu of choices output to the user interface module 526 that provide an interface to utility and firmware software associated with the bar code reader module 510, RFID reader module 518, RFID writer module 520, report generator module 534 and other I/O devices in communication with the system, as will be discussed in greater detail herein.

The report generation module 534 may be accessed through the user interface module 526 to allow the operator to generate transaction reports, reports on particular instrument trays and instrument tray shipping totes as well as to generate labels, tags and other documents related to shipping tote processing.

Figure 9:
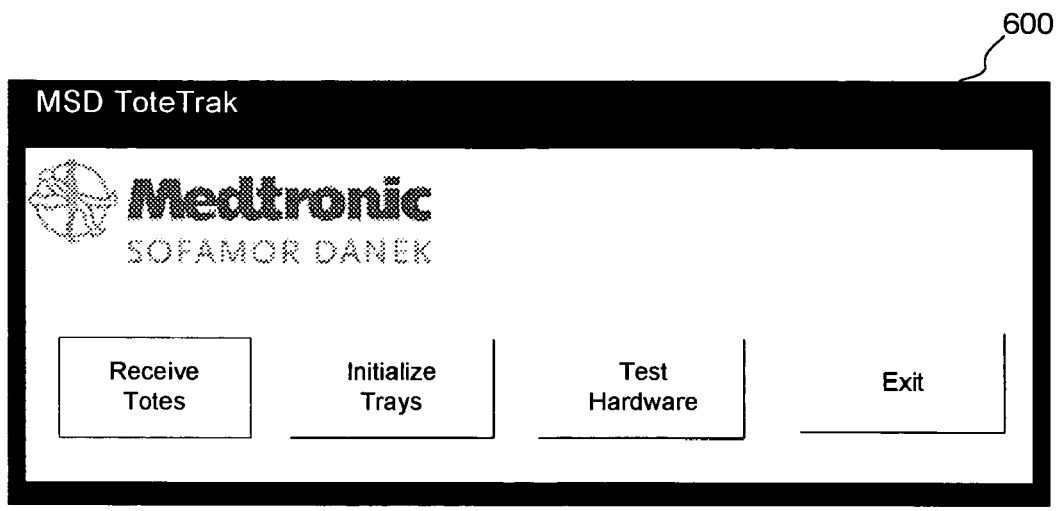
FIG. 9 is an exemplary screen shot of a high level user main menu of a user interface for a surgical instrument tray shipping tote processing system according to at least one embodiment of the invention.

Referring now to FIGS. 9-12, various exemplary user interface module screen shots are depicted in accordance with one or more embodiments of the invention. FIG. 9 is an exemplary screen shot of a user main menu of a user interface for a surgical instrument tray shipping tote processing system according to at least one embodiment of the invention. The menu 600 of FIG. 9 is a high level menu that provides the operator with a plurality of choices relating to shipping tote processing. In this example, the menu includes a receive totes option, an initialize tray option, a test hardware option and an exit option. As discussed herein, selecting the receive totes option will cause the tote receive process to begin, including bar code scanning and RF reading to identify the current shipping tote and the surgical instrument trays contained within the tote.

Figure 10:
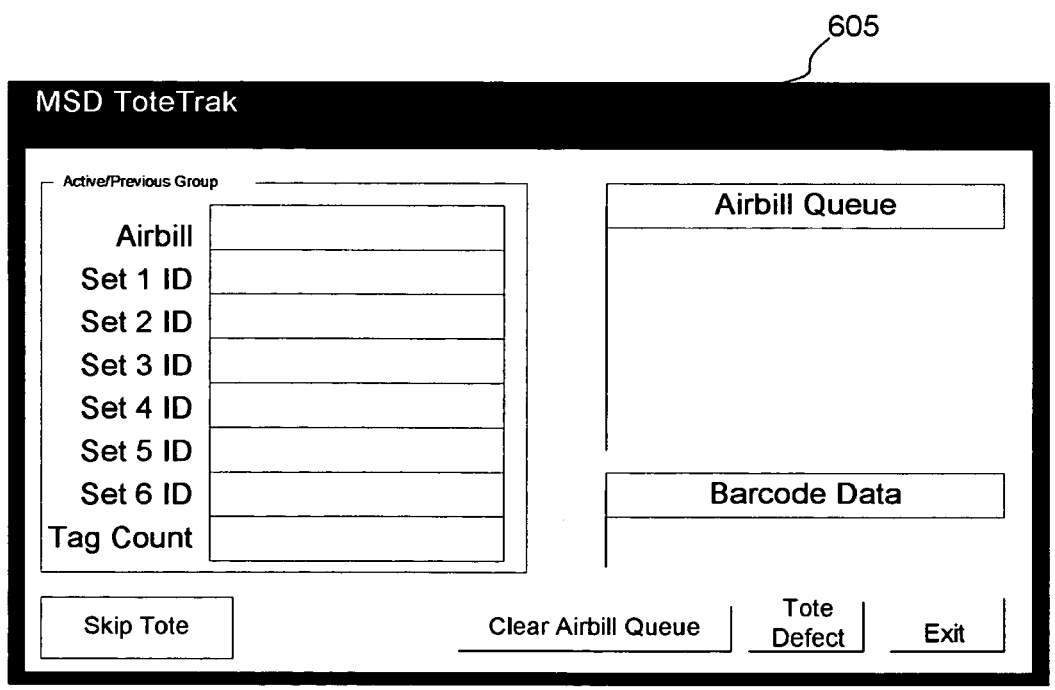

FIG. 10 is an exemplary screen shot of a receive tote user interface screen for a surgical instrument tray shipping tote processing system according to at least one embodiment of the invention. As shown in FIG. 10, the screen 605 includes fields for air bill queue, bar code data, air bill number and ID number each trays. Referring now to FIG. 11, when an air bill label from a tote is scanned with the bar code reader, the corresponding bar code number appears in the air bill field of the screen 610. Information read from each RFID-enabled surgical instrument tray also appears in the Set ID fields. In the example of FIG. 11, there are 2 sets in the current tote.

Figure 13:
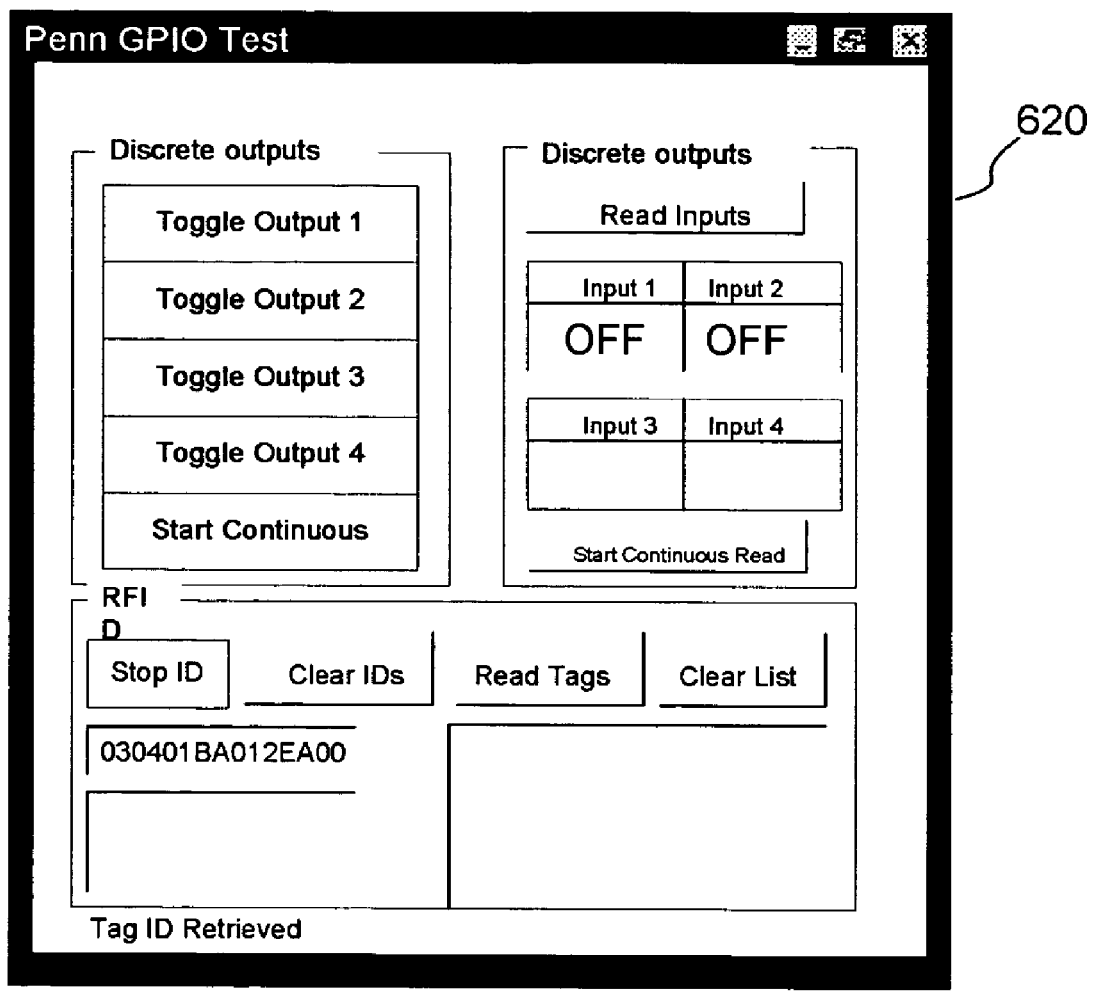
FIG. 13 is an exemplary screen shot of a test hardware interface screen of a surgical instrument tray shipping tote processing system according to at least one embodiment of the invention.

Referring now to FIG. 12, an exemplary screen shot of an initialize tray interface screen of a surgical instrument tray shipping tote processing system according to at least one embodiment of the invention is depicted. The screen 615 includes fields for inputting tray name and tray ID. As discussed herein, either or both of the inputs may be entered manually with an attached keyboard, selected through a menu or other input means, or may be input through the assistance of a bar code reader, such as, for example by scanning a bar code label containing the information coded as a bar code. In some embodiments, the name may be inputted manually while the RFID number may be a number read directly from an blank RFID tag. The input data may be simply stored in a database so that subsequent reads of the tag recognize the tray by name. Alternatively, the data may be written to the tag using the RFID writer. As discussed herein, if data is written to the tag, initialing the tray may also comprise validating the initialization operation by re; and FIG. 13 is an exemplary screen shot of a test hardware interface screen of a surgical instrument tray shipping tote processing system according to at least one embodiment of the invention. The screen 620 illustrated in the figure includes a plurality of control adapted to permit the operator to perform reader and discrete I/O interfacing and function testing. One of the functions provided by this screen 620 is to read tags in a continuous mode. This will allow the operator to insure that the system is performing properly. In various embodiments, reading a tag in this mode only reads the identification information of the tag itself, that is, the tag's unique ID number, ignoring any information written to the tag's unlocked memory. In various embodiments, the screen 620 will also allow the user to read an RFID tag that is placed in the reader field. This allows the user to simulate the data capture read function of the RFID reader module. Reading a tag in such embodiments provides the tag's unique identification number as well as any information written to the tag's memory. It should be appreciated that the functionality shown in test hardware screen 620 is exemplary only. More, less or other functions may be provided such as access to routines and/or programs for testing other discrete I/O system components of the shipping tote processing system.

The embodiments of the present inventions are not to be limited in scope by the specific embodiments described herein. For example, although many of the embodiments disclosed herein have been described with reference to processing surgical instrument tray shipping totes and control and/or operator systems for systems for processing surgical instrument tray shipping totes. The principles herein are equally applicable to other aspects radio frequency-based identification. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed:

1. A surgical instrument tray shipping tote tracking system comprising:
    a dual purpose bar code scanner and RFID reader/writer device; and
    a series of computer readable instructions stored in the dual purpose device adapted to cause the device to:
    activate a bar code scanner to obtain bar code data from a bar coded label affixed to a surgical instrument shipping tote;
    activate an RFID reader to obtain identification information from one or more surgical instrument trays in the shipping tote;
    query a database containing status information using at least one of the bar code data and identification information; and
    activate an indicator based on the results of querying the database.

2. The system according to claim 1, wherein querying a database comprises querying an ERP system software system to determine if any surgical instrument tray in the tote requires special handling.

3. The system according to claim 1, wherein querying the database comprises determining whether any surgical instruments trays are missing from the tote or any unexpected trays are present.

4. The system according to claim 1, wherein the series of computer readable instructions further comprises instructions for storing the bar code data and corresponding identification information in the database.

5. The system according to claim 1, wherein the series of computer readable instructions further comprises instructions for initializing a surgical instrument tray.

6. The system according to claim 5, wherein instructions for initializing a surgical instrument tray comprise instructions for receiving a data input and instructions for storing the data input in association with an ID number of the tray.

7. The system according to claim 5, wherein instructions for initializing a surgical instrument tray comprise instructions for initializing a surgical instrument tray comprise instructions for transmitting an RF signal containing the data input to an RFID tag associated with the surgical instrument tray.

8. The system according to claim 7, wherein the instructions for initializing a surgical instrument tray further comprises instructions for activating an RF reader to transmit a read signal to read the data input from the RFID tag.

9. The system according to claim 6, wherein instructions for receiving a data input comprise instructions for receiving a manual data input as the data input.

10. The system according to claim 6, wherein instructions for receiving a data input comprise instructions for activating a bar code scanner and receiving an input from the bar code scanner as the data input.

11. A computer readable storage medium containing computer readable instructions stored therein for operating a surgical instrument tray shipping tote inventory management system, the instructions comprising:
    instructions for activating a bar code reader and for receiving a first input from the bar code reader, the first input originating from a shipping tote air bill label associated with the shipping tote;
    instructions for activating an RFID reader and for receiving at least one second input from the RFID reader, the at least one second input originating from an RFID transponder tag corresponding to a surgical instrument tray in the shipping tote;
    instructions for querying a status database using at least one of the first input and second input; and
    instructions for activating a status indicator.

12. The computer readable storage medium according to claim 11, wherein the instructions for querying a status database comprise instructions for querying an ERP system, instructions for storing the at least one second input in association with the first input in the ERP system, and instructions for determining a status of at least one surgical instrument tray in the shipping tote.

13. The computer readable storage medium according to claim 11, wherein the instructions for querying a status database further comprise instructions for determining if any surgical instrument tray in the tote requires special handling.

14. The computer readable storage medium according to claim 11, wherein the instructions for querying a status database further comprise instructions for determining whether any surgical instruments trays are missing from the tote or any unexpected trays are present.

15. The computer readable storage medium according to claim 11, wherein the instructions for querying a status database further comprise instructions for storing the first and second data inputs in the database.

16. The computer readable storage medium according to claim 11, further comprising instructions for initializing a surgical instrument tray.

17. The computer readable storage medium according to claim 16, wherein instructions for initializing a surgical instrument tray comprise instructions for receiving a data input and instructions for storing the data input in association with an ID number of the tray.

18. The computer readable storage medium according to claim 16, wherein instructions for initializing a surgical instrument tray comprise instructions for transmitting an RF signal containing the data input to an RFID tag associated with the surgical instrument tray.

19. The computer readable storage medium according to claim 16, wherein instructions for receiving a data input comprises instructions for receiving a manual data input as the data input.

20. The computer readable storage medium according to claim 16, wherein instructions for receiving a data input comprises instructions for activating a bar code scanner and receiving an input from the bar code scanner as the data input.

21. The computer readable storage medium according to claim 16, wherein the instructions for initializing a surgical instrument tray further comprise instructions for activating an RF reader to transmit a read signal to read the data input from the RFID tag.

22. A control system for a surgical instrument tray shipping tote processing system comprising:
 a bar code scanner module adapted to activate a bar code scanner and receive a bar coded input indicative a surgical instrument shipping tote air bill label;
 an RFID module adapted to activate an RFID reader and receive identification information from one or more RF enabled surgical instrument trays in the shipping tote;
 a status module adapted to query a status database using at least of the bar coded input and the identification information to determine a status associated with the tote; and
 an indicator module adapted to activate one of a plurality of indicators based on the determined status.

* * * * *